(12) United States Patent
Wu

(10) Patent No.: US 7,367,351 B2
(45) Date of Patent: May 6, 2008

(54) TAP PRESSURE BALANCE VALVE

(76) Inventor: Cheng-Wsiung Wu, No. 71, Tsao Kang Lane, Tsao Chung Li, Lu Kang Township, Changhua Hsien (TW)

(*) Notice: Subject to any disclaimer, the term of this patent is extended or adjusted under 35 U.S.C. 154(b) by 245 days.

(21) Appl. No.: 11/125,139

(22) Filed: May 10, 2005

(65) Prior Publication Data

US 2006/0254655 A1  Nov. 16, 2006

(51) Int. Cl.
*G05D 11/03* (2006.01)
*F16K 11/085* (2006.01)
*F16K 27/06* (2006.01)

(52) U.S. Cl. .................. 137/98; 137/315.09; 137/607; 285/101

(58) Field of Classification Search ................. 137/98, 137/100, 597, 607, 315.09, 315.11, 315.13; 285/101
See application file for complete search history.

(56) References Cited

U.S. PATENT DOCUMENTS

| | | | | |
|---|---|---|---|---|
| 3,841,670 A | * | 10/1974 | Bottoms | 285/101 |
| 4,022,242 A | * | 5/1977 | Turecek | 137/270 |
| 4,787,654 A | * | 11/1988 | Zeitlin | 285/101 |
| 5,332,233 A | * | 7/1994 | Futa et al. | 277/638 |
| 5,425,394 A | * | 6/1995 | Clare | 137/270 |
| 5,730,171 A | * | 3/1998 | Niakan | 137/98 |
| 5,732,729 A | * | 3/1998 | Shieh | 137/100 |
| 5,931,181 A | * | 8/1999 | Cook et al. | 137/100 |
| 6,050,285 A | * | 4/2000 | Goncze et al. | 137/98 |
| 6,095,176 A | * | 8/2000 | Yang | 137/98 |

* cited by examiner

*Primary Examiner*—Stephen M. Hepperle
(74) *Attorney, Agent, or Firm*—Rabin & Berdo, P.C.

(57) ABSTRACT

A tap pressure balance valve for maintaining normal operation of the tap has a coil spring and a cut-off washer disposed in a though hole of a secondary case at where in relation to a water outlet provided on a deck of a primary case for the coil spring to push against the cut-off to maintain water tight between the through hole of the secondary case and the water outlet of the primary case so to avoid seepage from the interface where both cases are incorporated to each other.

2 Claims, 3 Drawing Sheets

TAP PRESSURE BALANCE VALVE

BACKGROUND OF THE INVENTION (a) Field of the Invention

The present invention is related to a tap pressure balance valve, and more particularly to one that maintains normal operation of the tap by having disposed a coil spring and a cut-off washer, or seal, in a through hole of a secondary case at where in relation to an water outlet from a deck of a primary case for the coil spring to push against the cut-off washer to maintain watertightness between the through hole and the water outlet of the primary case thus to prevent seepage from the interface where the primary and the secondary cases are incorporated to each other.

(b) Description of the Prior Art

A mixer valve is usually provided inside a tap so to mix the hot and the cold water before being delivered through a sprout for use. The construction of a mixer valve to a tap of the prior art to mix hot water and cold water tends to focus on the design of mixing without safety measures to cope with abnormal conditions including interrupted supply of water. Therefore, when the supply either of the hot water or the cold water is interrupted, the sprout remains delivery the water to cause sudden supply of hot or cold water only. Sudden cold water supply particularly in the wintertime would expose the user to catch cold; and sudden hot water, to be scalded. To correct this problem, an improvement was introduced by providing a pressure balance valve to automatically stop water delivery in case of sudden interruption of hot or cold water for safety concerns.

The pressure balance valve of the prior art is essentially comprised of having a rubber diaphragm inserted into the space inside a combined case, and a balance valve inserted through a through hole disposed at the center of the diaphragm. In normal supply of cold and hot water, the diaphragm stays at its position in the case while the valve is away from its status to close up both inlets of hot and cold water. When either hot or cold water supply is suddenly interrupted, the changed water pressure causes the diaphragm to be deformed and displaced, leading further to the valve to the end of the water is not interrupted to contact its water inlet and to indicate watertight status. Since the other end of the water is already interrupted, the supply of both hot and cold water is stopped to prevent a sudden supply of cold or hot water only, thus to prevent the user from catching cold or getting scalded.

However, in the prior art, the installation of the diaphragm and the valve is achieved by having their respective cases combined to each other. The possible seepage at the interface between both cases must be taken into consideration. To achieve watertight results, usually a cut-off washer is provided to the interface to present seepage of water from the interface of combination.

Both cases must compress against the cut-off washer for the cut-off washer to achieve the watertight results, i.e., close coordination from the interface of the combined cases must be provided. Any error in the manufacturing process of the interface between the combined cases would fail to provide good watertight results, leading to possible seepage from the interface between the combined cases that may significantly affect the normal operation of the tap as a whole.

Furthermore, a shallow slot may be provided on the case for the insertion of the cut-off; however, insufficient depth of the slot fails to effectively secure the water. As a result, the water is vulnerable to leaking or deflection in the course of the combination of both cases to compromise the assembly quality and function. During the assembly process, greater compression force is required for the cases to secure the cut-off washer for the expected watertight results. Accordingly, how to secure ideal watertight results for the pressure balance valve of the tap becomes the primary target of the R&D efforts for the present invention.

SUMMARY OF THE INVENTION

The primary purpose of the present invention is to provide a tap pressure balance valve to easily achieve excellent watertight results in the combination of cases of the balance valve thus to prevent seepage from the interface between both cases while maintain normal operation of the tap as a whole.

Another purpose of the present invention is to provide a tap pressure balance valve to easily achieve excellent positioning results for the water stop accessories in their assembly process, thus to save labor cost while minimizing impacts of case process precision upon the watertight efficacy.

To achieve those purposes, the present invention is essentially comprised of having a coil spring and a cut-off washer disposed in a though hole of a secondary case at a place in relation to a water outlet provided on a deck of a primary case for the coil spring to push against the cut-off washer to maintain watertightness between the through hole of the secondary case and the water outlet of the primary case so to avoid seepage from the interface where both cases are incorporated (or, assembled) to each other.

DETAILED DESCRIPTION OF THE PREFERRED EMBODIMENTS

Figure 1:
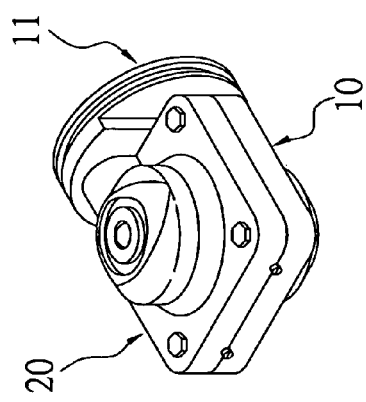
FIG. 1 is a schematic view showing the construction of a preferred embodiment of the present invention.
Figure 2:
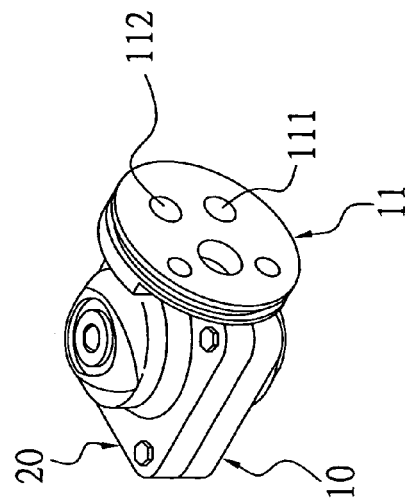
FIG. 2 is another schematic view showing the construction of a preferred embodiment of the present invention.
Figure 3:
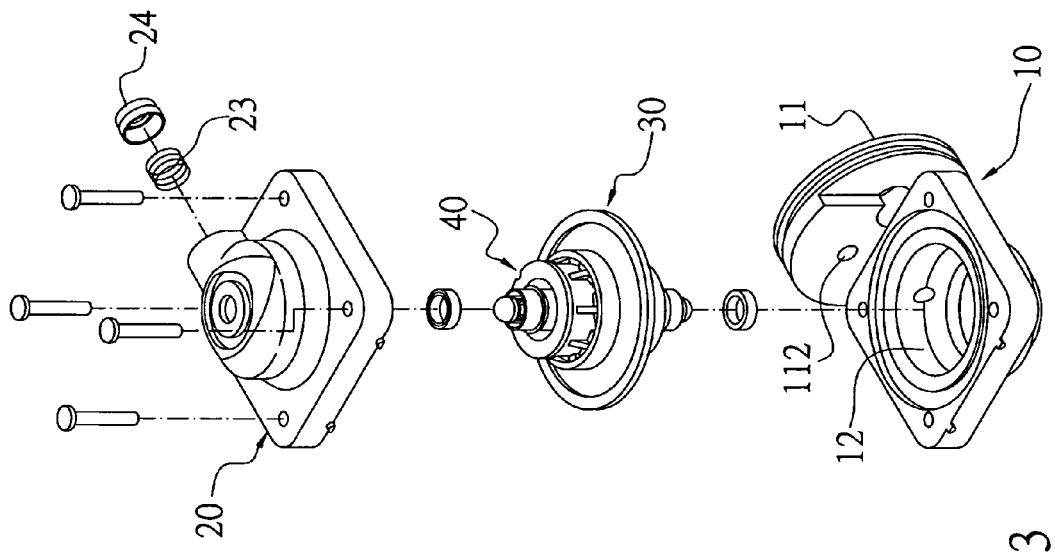
FIG. 3 is an exploded view of the preferred embodiment of the present invention.
Figure 4:
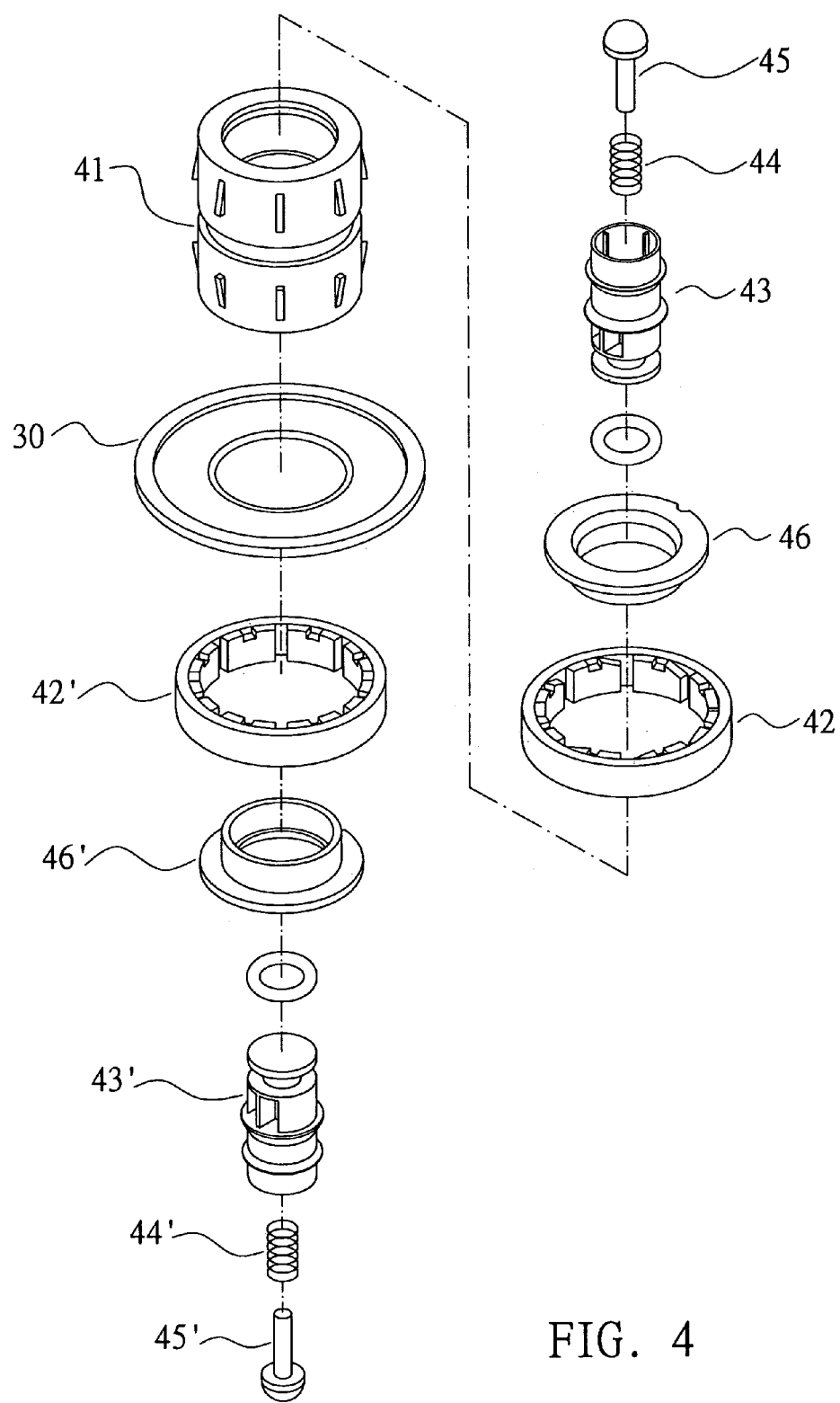
FIG. 4 is an exploded view of a pressure balance valve of the preferred embodiment of the present invention.
Figure 5:
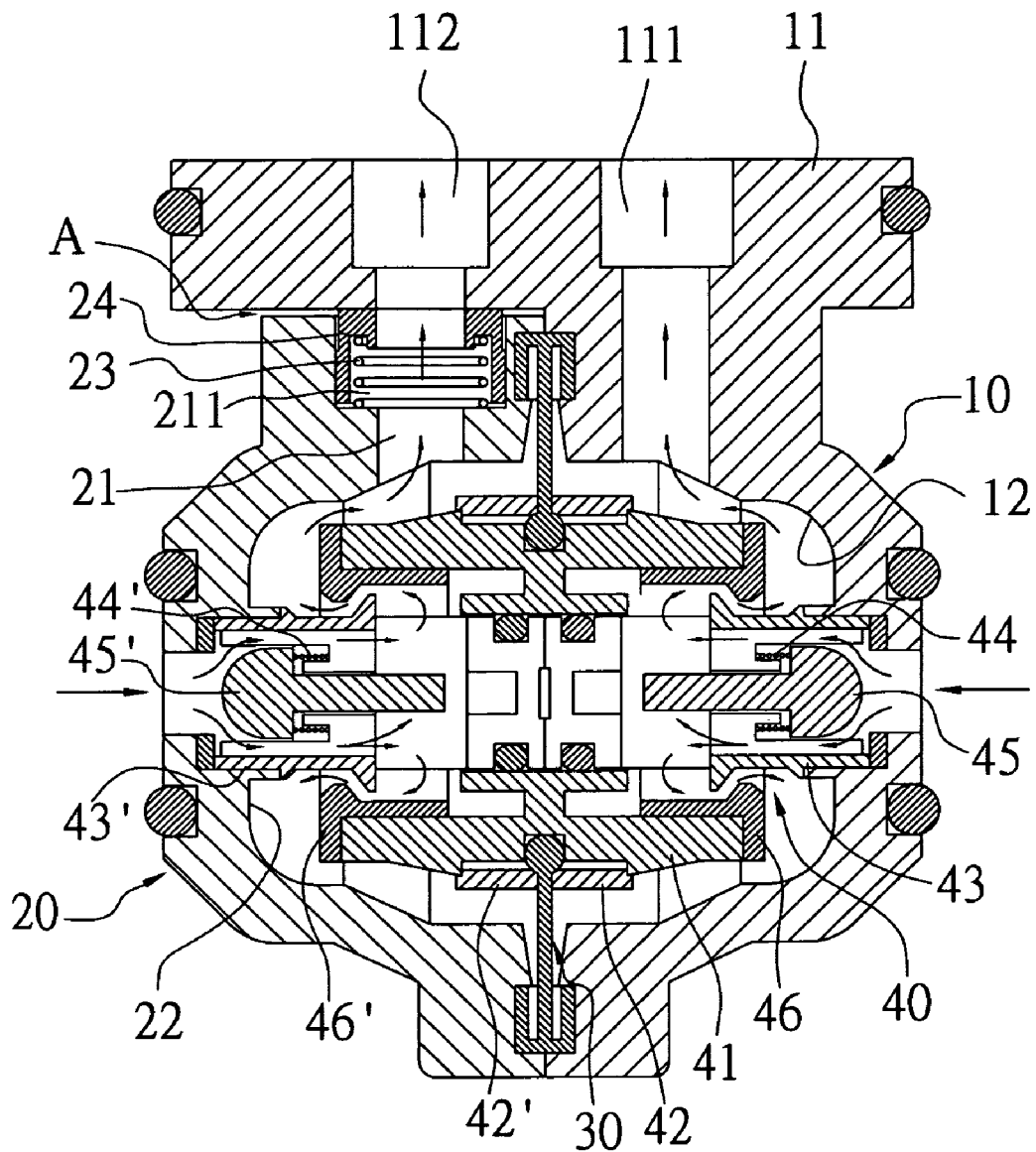
FIG. 5 is a sectional view of the preferred embodiment of the present invention.

Referring to FIGS. 1 through 5, a preferred embodiment of the present invention is essentially comprised of a primary case (10) and a secondary case (20) riveted to each other to form a case for the balance valve; and a balance diaphragm (30) and a balance valve (40) disposed in the space defined by both cases (10, 20).

Wherein, a deck (11) that contacts a water control valve (not illustrated) extends from the top of the primary case (10); a water outlet (111) penetrating through a chamber (12) in the primary case (10) is provided on the deck (11) and another water outlet (112) penetrating through the secondary case (20) at where it is combined to the primary case (10); a through hole (21) is provided to the secondary case (20) at where in relation to the water outlet (112) from the deck (11) of the primary case (10); the through hole (21) penetrates through a chamber (22) inside the secondary case (20); the upper section of the through hole (21) relates to a flared section (211) containing a coil spring (23) and a cut-off washer, or seal, (24); the outer diameter of the cut-off washer (24) substantially equal to the inner diameter of the flared section (211) of the through hole (21) from the secondary casing (20) to realize a watertight status between the cut-off washer (24) and the flared section (211); and the inner diameter of the cut-off washer (24) is substantially equal to that of the through hole (112) of the deck (111) from the primary case (10) so to realize watertight status by having the cut-off washer (24) to touch the base of the deck (11) of the primary case (10) when the cut-off washer (24) is pushed against by the coil spring (23). Accordingly, the through hole (21) from the secondary case (20) is connected to the through hole (112) from the primary case (10).

The balance valve (40) includes a base (41) inserted to the balance diaphragm (30). Wherein, the insertion between the balance diaphragm (30) and the base (41) is secured by two rings (42, 42') disposed on both sides of the balance valve (40); two valve seats (43, 43 are then inserted into the base (41) from both ends of the base (41); both valve seats (43, 43') respectively contain coil springs (44, 44') and bolts (45, 45 for both coil springs (44, 44') to provide flexible compression and motion play to both bolts (45, 45'); and finally both ends of the base (41) are respectively plugged with two retaining rings (46, 46') to limit both valve seats (43, 43') from escaping. Before admitting any water, both bolts (45, 45') of the balance valve (40) are pushed by both coil spring (44, 44') respectively hold against water inlets of the primary case (10) and the secondary case (20). Once water is admitted, both bolts (45, 45') are subject to water pressure retreat to keep the water lines unobstructed. Should either water line be interrupted, the balanced water pressure is compromised to push the balance diaphragm (30) and the balance valve (40) toward the water line that is cut off; meanwhile, the retaining ring (46) is deviated to contact its valve seat (43) to become watertight for cutting off the water supply from both water lines (the art described above also relates to the prior art, therefore, no elaboration will be given here).

In the preferred embodiment, all parts of the balance valve (40) are first mounted to the balance diaphragm (30), both of the balance diaphragm (30) and the balance valve (40) are then inserted into the chamber (12) inside the primary case (10); and finally the secondary case (20) is incorporated to the primary case (10) at a pre-selected location and accommodates both of the balance diaphragm (30) and the balance valve (40) in its chamber (22). Accordingly, both of the balance diaphragm (30) and the balance valve (40) are accommodated in the space defined by both chambers (12, 22). Meanwhile, the coil spring (23) disposed in the flared section (211) of the through hole (21) from the secondary case (20) pushes against the cut-off washer (24) to force the top of the cut-off washer (24) to constitute watertight with the bottom of the deck (11) from the primary case (10), and thus to achieve water cut-off washer results at the interface between both of the primary and the secondary cases (10, 20). Even though a gap (A) does exist between the top of the secondary case (20) and the bottom of the deck (11) of the primary case (10), the watertight status is easily achieved with the coil spring (23) pushing against the cut-off washer (24). The present invention by providing the coil spring (23) and the cut-off washer (24) allows easy combination of both of the primary and the secondary cases (10, 20) to realize excellent watertight efficacy so that both of hot water and cold water are respectively supplied from the chamber (12) of the primary case (10) through the water outlet (111) and from the chamber (22) of the secondary case (20) through the water outlet (112) to arrive at the water control valve on top (not illustrated) and prevents seepage from the interface where both of the primary and the secondary cases (10, 20) are incorporated to each other for maintaining normal operation of the pressure balance valve of the present invention as a whole.

As described above, the tap pressure balance valve of the present invention is designed by having the secondary case relatively connect through both of the coil spring and cut-off washer built in the through hole of the water outlet on the deck of the primary case to automatically achieve watertight results by having the coil spring to push against the cut-off washer. Wherein, even if there is any gap existing at the interface between both of the primary and the secondary cases due to process error, pushing against the waster by the coil spring allows easy water cut-off results without the risk of seepage to effectively eliminate those flaws found with the prior art.

The present invention of an improved construction of a tap pressure balance valve by providing a coil spring and a cut-off washer to easily achieve watertight results allows easy assembly and excellent water cutoff results to maintain the normal operation of the pressure balance valve as a whole in giving excellent industrial value and utility. Therefore, this application for a utility patent is duly filed.

The invention claimed is:

1. A tap pressure balance valve includes
   a case comprised of a primary case and a secondary case incorporated to each other;
   a balance diaphragm and a balance valve in each chamber of the primary and the secondary cases;
   a deck to contact a water control valve extending from the top of the primary case;
   a first water outlet penetrating through the chamber of the primary case being provided on the deck;
   a second water outlet penetrating through the secondary case where it is to be combined with the primary case being assembled to the secondary case; and
   a through hole being disposed in the secondary case in relation with the first water outlet on the deck from the primary case; the through hole passing through the chamber of the secondary case to connect the second water outlet;
   the top of the through hole of the secondary case including a flared section to contain a coil spring and a cut-off washer; the coil spring pushing against the cut-off washer to achieve watertight status between the cut-off washer and a bottom of the deck of the primary case once the secondary case is assembled to the primary case at a pre-selected location;
   whereby seepage from the interface between the primary and the secondary cases is prevented to maintain normal operation of the tap pressure balance valve;
   wherein a gap exists between a top of the secondary case and a bottom of the deck of the primary case, and the coil spring pushes against the cut-off washer.

2. The tap pressure balance valve of claim 1, wherein the outer diameter of the cut-off washer is approximately equal to the inner diameter of the flared section of the through hole from the secondary case to achieve watertight status between the cut-off washer and the flared section; the inner diameter of the cut-off washer is equal to the through hole on the deck from the primary case; and the cut-off washer contacts the bottom of the deck from the primary case when pushed against by the coil spring to provide watertight results.

* * * * *